Patented Oct. 21, 1930

1,779,345

UNITED STATES PATENT OFFICE

ALFRED THAUSS, OF COLOGNE-DEUTZ, ARNOLD DOSER, OF COLOGNE-MULHEIM, AND GUSTAV MAUTHE, OF COLOGNE-HOLWEIDE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONDENSATION PRODUCTS OBTAINABLE FROM UNSATURATED HIGHER FATTY ACIDS AND PHENOLS

No Drawing. Application filed February 1, 1928, Serial No. 251,223, and in Germany February 8, 1927.

The present invention relates to new condensation products obtainable from unsaturated higher fatty acids and phenols and a process of preparing same. The process for their production consists in causing the said compounds to react with one another in the presence of dilute mineral acids and in sulfonating the condensation products thus obtainable.

In accordance with the invention hydroxy aryl groups are readily attached to the chain of unsaturated higher fatty acids and these are thereby converted into bodies, which are distinguished in the lower stages of condensation from the respective starting materials by solubility in the majority of solvents. The chemical and physical properties of these bodies are dependent to a large degree upon the nature of the phenol employed, upon the water content of the mineral acid and the duration of the action, in so far as the more dilute acids favour the formation of simpler condensation products, which are still easily soluble, whilst the more concentrated acids tend to form insoluble condensation products.

It is not necessary to start from the free fatty acids; it is quite possible to employ their glycerine esters, which occur in nature as fatty oils and as such are available in large quantities, such as for example as linseed oil, olive oil, China wood oil and the like.

The new products are adapted to be used for varied technical purposes, for example as auxiliary materials in the textile industry in the form of their water-soluble sulfonic acids.

The following examples will illustrate our invention:

Example 1.—50 parts by weight of phenol are dissolved in 60 parts by weight of China wood oil and 60 parts by weight of sulfuric acid of spec. grav. 1.30 are added. The mixture is emulsified by means of a rapid stirrer and is kept for about 8 to 10 hours at the temperature of the water-bath, until the smell of wood oil has disappeared and a sample is easily dissolved to form a clear solution in dilute boiling sodium carbonate solution or in pure water, after treatment with sodium carbonate. When the sulfuric acid and any still adhering traces of phenol have been washed out, the reaction product remains as a slightly colored odorless mass with a salve-like consistency and is miscible with alcohol, ether, benzene, glacial acetic acid, but insoluble in petroleum ether. It dissolves readily in concentrated sulfuric acid showing a yellowish brown coloration. The sulfonic acid thus produced can be precipitated on dilution only by the addition of common salt or of a stronger mineral acid in the form of a light, resinous mass, which is also readily soluble in water.

Example 2.—30 parts by weight of linseed oil, 20 parts by weight of phenol and 25 parts by weight of sulfuric acid (50%) of spec. grav. 1.4 are vigorously stirred for several hours on the water-bath until a sample readily dissolves to a clear solution on boiling with dilute sodium carbonate solution. After removing any still unchanged phenol residues by boiling, a faintly brownish colored mass of butter like consistency remains, which is readily soluble in alcohol, ether, benzene, glacial acetic acid, scarcely soluble in petroleum ether, but readily soluble in sulfuric acid monohydrate without the formation of any resins to form a sulfonic acid which is soluble in water without coloration and which can be salted out with common salt.

Example 3.—When a mixture of 60 parts by weight of wood oil and 50 parts by weight of phenol is treated in a similar manner to that described in Example 1 with stronger sulfuric acid, for example 70 grams of sulfuric acid of spec. grav. 1.4, the mass coagulates after several hours forming a tough and very elastic mass, which is no longer soluble in alkalies. It is attacked with difficulty by sulfuric acid monohydrate, a sulfonic acid being formed.

By the term "unsaturated higher fatty acid compound" in the claims we understand the fatty acids and their glycerine esters.

We claim:
1. Process for the manufacture of condensation products, which process comprises re- acting an unsaturated higher fatty acid compound with a phenol in the presence of a dilute mineral acid and treating the condensation product with a sulfonating agent.

2. Process for the manufacture of a condensation product, which process comprises reacting China wood oil with phenol in the presence of diluted sulfuric acid and treating the condensation product with concentrated sulfuric acid.

3. New condensation products obtainable by causing an unsaturated higher fatty acid compound and a phenol to react with one another in the presence of a dilute mineral acid, and treating the condensation product with a sulfonating agent, being generally strongly viscous, resin-like substances which, in the form of their alkali metal salts, are easily soluble in water.

4. A new condensation product obtainable by causing China wood oil and phenol to react with one another in the presence of diluted sulfuric acid, and treating the reaction mass with concentrated sulfuric acid, being a resinous mass which, in the form of its alkali metal salts, is easily soluble in water.

In testimony whereof we have hereunto set our hands.

ALFRED THAUSS.
ARNOLD DOSER.
GUSTAV MAUTHE.